United States Patent
Parker et al.

(10) Patent No.: US 6,366,930 B1
(45) Date of Patent: Apr. 2, 2002

(54) INTELLIGENT DATA INVENTORY & ASSET MANAGEMENT SYSTEMS METHOD AND APPARATUS

(75) Inventors: James A. Parker; Gary J. Legner, both of Phoenix; George Lima, Glendale; David P. Schwartz, Phoenix; James R. Gunkel, Chandler, all of AZ (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 08/835,609

(22) Filed: Apr. 9, 1997

Related U.S. Application Data

(60) Provisional application No. 60/015,327, filed on Apr. 12, 1996.

(51) Int. Cl.[7] .............................................. G06F 17/00
(52) U.S. Cl. ........................ 707/203; 707/6; 707/204; 707/101
(58) Field of Search ............................ 707/1–206, 540; 395/701–712

(56) References Cited

U.S. PATENT DOCUMENTS

| | | | |
|---|---|---|---|
| 3,585,601 A | 6/1971 | Lahraon | 340/172.5 |
| 3,735,348 A | 5/1973 | Cornell | 340/172.5 |
| 3,836,768 A | 9/1974 | Clarke | 246/3 |
| 4,051,459 A | 9/1977 | Steranko | 364/900 |
| 4,109,238 A | 8/1978 | Creekmore | 340/149 A |
| 4,187,498 A | 2/1980 | Creekmore | 340/149 A |
| 4,272,757 A | 6/1981 | McLaughlin | 340/152 R |
| 4,284,943 A | 8/1981 | Rowe | 318/806 |
| 4,369,563 A | 1/1983 | Williamson | 29/568 |
| 4,686,620 A | 8/1987 | Ng | 364/200 |
| 4,733,354 A | 3/1988 | Potter | 364/415 |

(List continued on next page.)

OTHER PUBLICATIONS

Additional Information for the RCE Revision Control Engine Release 1.5.0, Jul. 28, 1995 originally News.txt file included with software from XCC Software, Karlsruche, Germany.

RCE—The Revision Control Engine—The Successor of RCS, Jul. 1995 originally Readme.txt file included with software from SCC Software, Karlsruche, Germany.

RCE BDE, document downloaded on Aug. 14, 1998 from DuraSoft GmbH Internet RCE home page at http://wwwip-d.ira.uka.de/~RCE/.

*Primary Examiner*—Thomas Black
*Assistant Examiner*—David Yiuk Jung
(74) *Attorney, Agent, or Firm*—Baker Botts L.L.P.

(57) ABSTRACT

A computerized process of intelligently inventorying data and managing assets includes the steps of initially inventorying a plurality of hardware, software, and data files on-site by assigning a hexadecimal signature identifying each file in the database, inventorying the files at a subsequent time by repeating the prior step and comparing the previous and current signatures of the files to determine whether any of the files have been changed, comparing the current version of a changed file to the last previous on-site version of the changed file, computing the differences between the two versions by different forward and reverse algorithms to provide a forward delta and a reverse delta, storing the current version and the reverse delta of the changed file on-site while deleting the last previous on-site version of the changed file, permanently storing off-site the forward deltas of each changed file and a baseline copy of each new file, restoring any requested file, if on-site, by recovering the current version and subtracting the appropriate reverse deltas therefrom until the requested file is produced, or, if off-site, by recovering the baseline version and adding the appropriate forward deltas thereto until the requested file is reproduced. The inventorying process enables the system to issue warnings for deleted files, possible corruption of files, and unidentified possibly valued asset files.

16 Claims, 7 Drawing Sheets

U.S. PATENT DOCUMENTS

| | | | |
|---|---|---|---|
| 4,734,789 A | 3/1988 | Smith | 358/300 |
| 4,741,047 A | 4/1988 | Sharpe | 382/56 |
| 4,827,330 A | 5/1989 | Walsh | 382/280 |
| 4,827,462 A | 5/1989 | Flannagan | 369/32 |
| 4,838,275 A | 6/1989 | Lee | 128/670 |
| 4,853,878 A | 8/1989 | Brown | 364/521 |
| 4,864,569 A | 9/1989 | DeLucia | 371/19 |
| 4,887,129 A | 12/1989 | Shenoy | 355/218 |
| 4,891,503 A | 1/1990 | Jewell | 235/380 |
| 4,897,782 A | 1/1990 | Bennett | 364/200 |
| 4,901,100 A | 2/1990 | DiBianca | 355/328 |
| 4,912,637 A * | 3/1990 | Sheady et al. | 707/203 |
| 4,935,867 A | 6/1990 | Wang | 364/200 |
| 5,020,122 A | 5/1991 | Walsh | 385/56 |
| 5,047,918 A | 9/1991 | Schwartz | 364/200 |
| 5,119,291 A | 6/1992 | Flannagan | 395/275 |
| 5,124,987 A | 6/1992 | Milligan | 375/10.1 |
| 5,133,065 A | 7/1992 | Cheffetz | 395/575 |
| 5,148,537 A | 9/1992 | Belsan | 395/455 |
| 5,163,148 A | 11/1992 | Walls | 395/600 |
| 5,165,012 A | 11/1992 | Crandall | 395/100 |
| 5,210,866 A | 5/1993 | Milligan | 395/575 |
| 5,214,579 A | 5/1993 | Wolfberg | 364/408 |
| 5,233,513 A | 8/1993 | Doyle | 354/401 |
| 5,247,660 A | 9/1993 | Ashcraft | 395/600 |
| 5,257,377 A | 10/1993 | Sathi | 395/700 |
| 5,257,387 A | 10/1993 | Richek | 395/800 |
| 5,261,820 A | 11/1993 | Slye | 434/43 |
| 5,263,148 A | 11/1993 | Jones | 395/500 |
| 5,278,979 A * | 1/1994 | Foster et al. | 707/203 |
| 5,280,574 A | 1/1994 | Mizuta | 395/146 |
| 5,299,116 A | 3/1994 | Owens | 364/403 |
| 5,317,732 A | 5/1994 | Gerlach | 395/600 |
| 5,317,733 A | 5/1994 | Murdock | 395/606 |
| 5,319,544 A | 6/1994 | Schmeier | 364/403 |
| 5,327,529 A | 7/1994 | Fults | 395/155 |
| 5,339,392 A | 8/1994 | Risberg | 395/161 |
| 5,345,581 A | 9/1994 | Comparetta | 395/575 |
| 5,353,432 A | 10/1994 | Richek | 395/500 |
| 5,375,068 A | 12/1994 | Palmer | 364/514 |
| 5,379,366 A | 1/1995 | Noyes | 395/54 |
| 5,412,756 A | 5/1995 | Bauman | 395/50 |
| 5,425,138 A | 6/1995 | Kamakawa | 395/148 |
| 5,426,010 A | 6/1995 | Morton | 430/22 |
| 5,428,525 A | 6/1995 | Cappelaere | 364/140 |
| 5,428,684 A | 6/1995 | Akiyama | 380/25 |
| 5,428,774 A | 6/1995 | Takahashi | 395/600 |
| 5,430,855 A | 7/1995 | Walsh | 395/275 |
| 5,432,932 A | 7/1995 | Chen | 395/650 |
| 5,440,705 A | 8/1995 | Wang | 395/421.1 |
| 5,444,851 A | 8/1995 | Woest | 395/200.1 |
| 5,448,729 A | 9/1995 | Murdock | 395/600 |
| 5,450,545 A | 9/1995 | Martin | 395/700 |
| 5,450,750 A | 9/1995 | Abler | 73/149 |
| 5,455,945 A | 10/1995 | VanderDrift | 395/600 |
| 5,463,735 A | 10/1995 | Pascucci | 395/200.1 |
| 5,475,421 A | 12/1995 | Palmer | 348/15 |
| 5,499,365 A * | 3/1996 | Anderson et al. | 707/103 |
| 5,581,764 A | 12/1996 | Fitzgerald et al. | 395/703 |
| 5,623,661 A * | 4/1997 | Hon | 707/1 |
| 5,634,052 A * | 5/1997 | Morris | 707/1 |
| 5,729,743 A * | 3/1998 | Squibb | 707/203 |
| 5,781,912 A * | 7/1998 | Demers et al. | 707/202 |
| 5,806,078 A * | 9/1998 | Hug et al. | 707/203 |
| 5,864,849 A * | 1/1999 | Bohannon et al. | 707/8 |
| 5,897,642 A * | 4/1999 | Capossela et al. | 707/1 |
| 5,983,241 A * | 11/1999 | Hoshino | 707/203 |

* cited by examiner

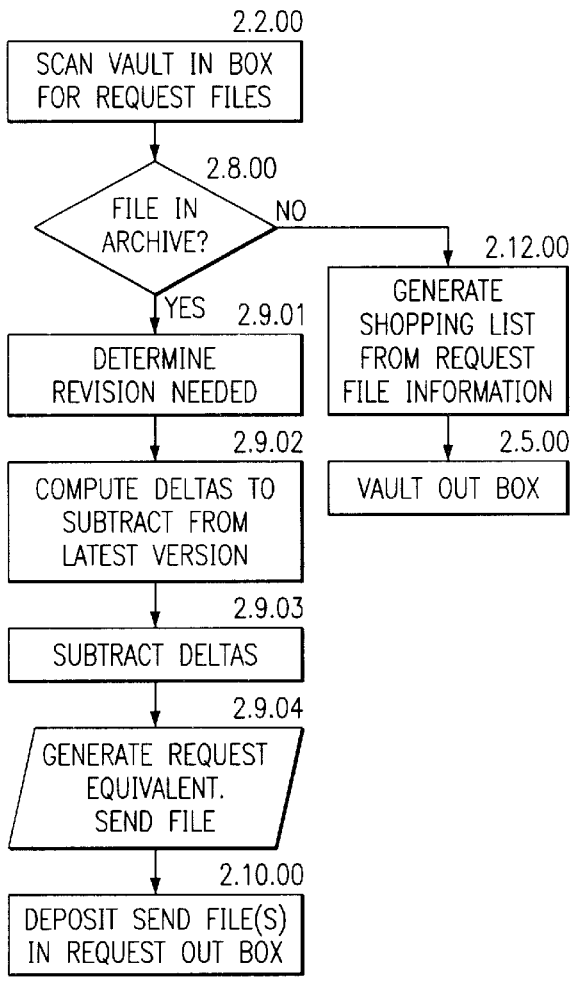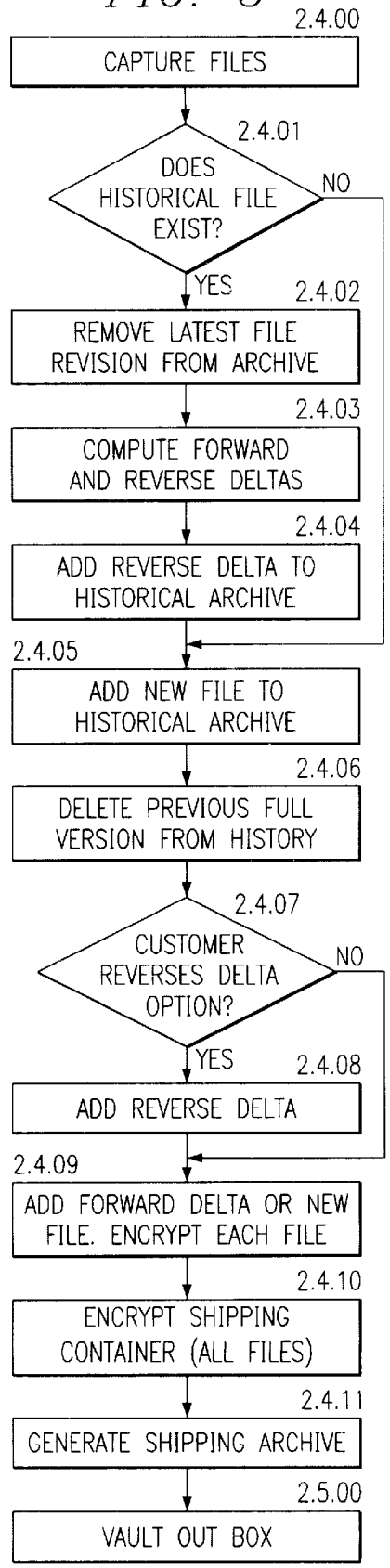

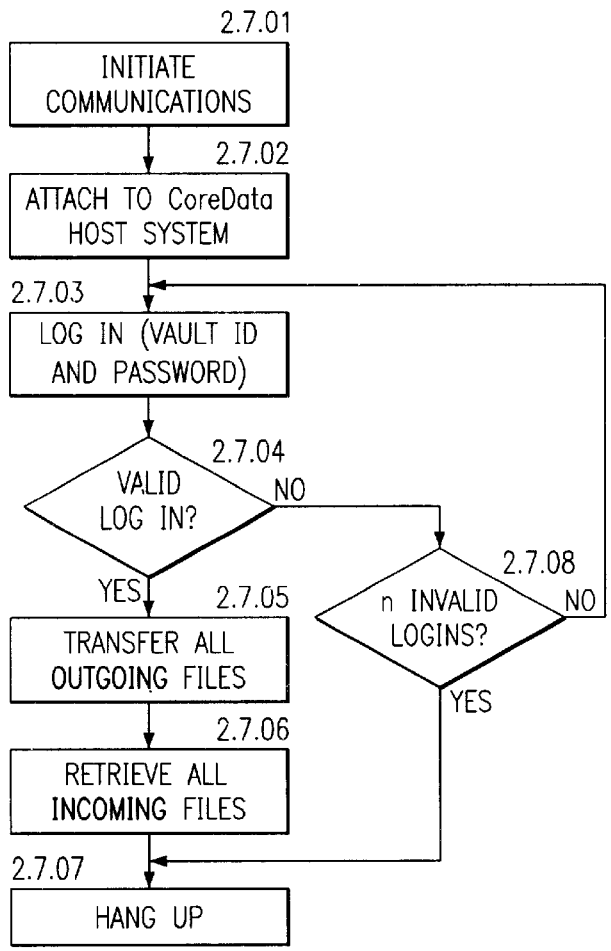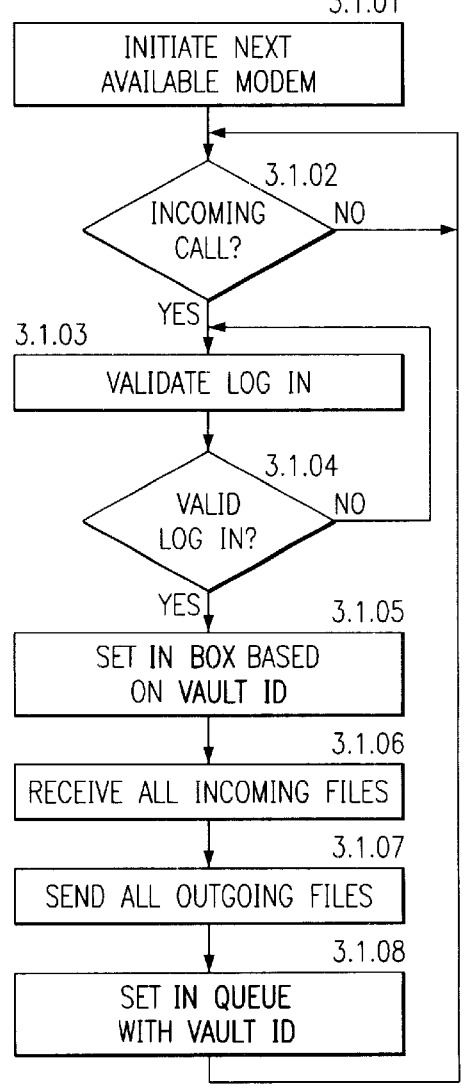

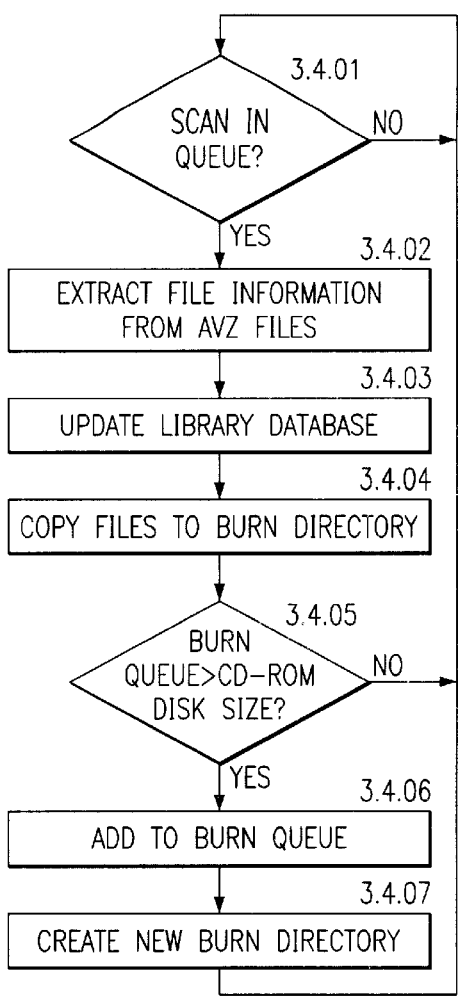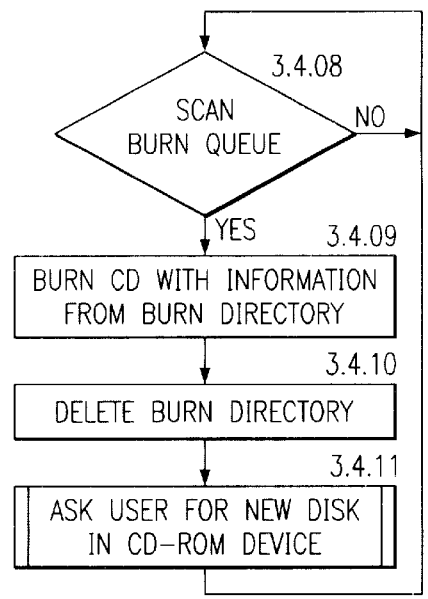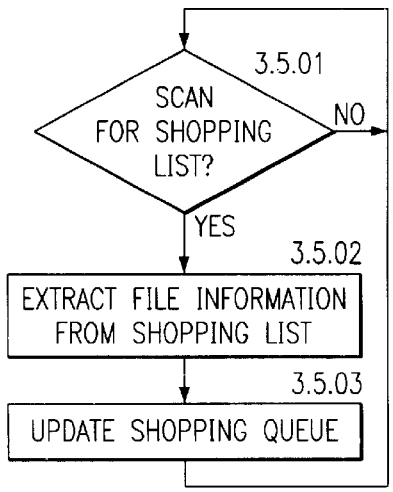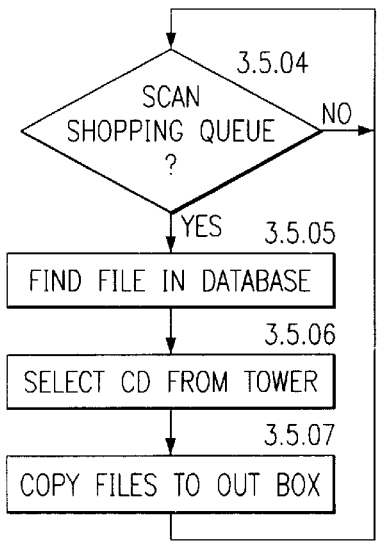

INTELLIGENT DATA INVENTORY & ASSET MANAGEMENT SYSTEMS METHOD AND APPARATUS

This application claims the benefit of U.S. Provisional Application No.: 60/015,327 Apr. 12, 1996.

BACKGROUND OF THE INVENTION

The present invention relates generally to apparatuses and methods of inventorying data and managing assets, and, more particularly, to a computerized system including a software program which periodically inventories a plurality of hardware, software, and data files by assigning a signature to each file, determines which of those files has been changed, identifies and saves the changes on-site and offsite and restores any requested file by reconstructing the file by applying selected stored changes to the current on-site version or the baseline off-site version.

It is known to save files on a computer system and to assign a brief coded description to each file. One such system to Flanagan in U.S. Pat. No. 5,119,291 discloses a write-once optical disc data recorder wherein the addition of data is stored in a non-linear manner in modularized and indexed directories. Each file version recorded on the disk is assigned a "file version description" (FIG. 4) which identifies the file version. A problem with this type of system is that it does not inventory hardware and software files and the signature is not in hexadecimal format. It is an object of the present invention to provide a software program that conducts an initial inventorying process which assigns a hexadecimal signature to identify all hardware, software, and data files in a given system and then compares current and previous signatures to determine whether any of the files have been added, omitted, or changed in any way.

Automatic document image revision systems for electronically storing revisions or modifications to documents which are already electronically stored in unrevised or unmodified form are also known. One such system to Walsh in U.S. Pat. No. 5,020,122 discloses an improved process for eliminating the degradation of the information in the original document whereby only the intended or significant modifications to a document were stored in the system. However, such process made pixel-to-pixel comparisons to generate a bit map image of the changes and was slow and cumbersome in reconstructing documents. See also Murdock U.S. Pat. No. 5,448,729 which discloses a system for the automation of virtually all clerical functions in an office, such as, an insurance company or law office in which a compete audit history of all activity to a specific database file record is maintained without saving the entire database record in a historical file. See also Cheffetz U.S. Pat. No. 5,133,065. See also Ashcraft U.S. Pat. No. 5,247,660 which discloses a method of dynamically managing the storage of information in a write-once media, such as, optical disks in a network utilizing remote computers and a central computer which controls both magnetic disks and optical disks (FIG. 1) with an algorithm for storing updates separately from the general data comprising the original document (FIG. 8). However, all of these systems fail to disclose computing forward and reverse deltas each time a record is changed or saving the current version on-site and the baseline version off-site. It is an object of the present invention to provide unique algorithms for determining forward and reverse deltas by comparing a historical and current version of a document while deleting all prior file versions other than an offsite baseline version and the on-site current version and using the deltas and stored versions to repeatably and efficiently recreate any requested version as it existed at any prior time.

Text document management processes which allow for generating plural revisions from the same original are also known, such as, the one to Mizuta in U.S. Pat. No. 5,280,574 which discloses a process whereby multiple arrangements of the original based on multiple sets of changes are derived and saved enabling a user to restore a particular arrangement by retrieving the original and the selected set of changes to reproduce the desired revised document. The process uses excessive storage. It is an object of the present invention to use minimum storage on-site and offsite by storing only a baseline version of a document offsite with all forward deltas and saving only the current version of the document on-site with all reverse deltas. The volume and time to transmit data to offsite storage and back to the on-site host is kept to a minimum.

It is a further object of the present invention to detect the precise changes made to a prior file in the system and then save the changes. An important step in this process is computing the differences between the two previous and current versions to provide a forward delta and a reverse delta, and, then, storing the current version and the reverse delta of the changed file on-site while deleting only the last previous on-site version of the changed file, and permanently storing off-site the forward delta of the changed file and a baseline copy of each new file. This process preferably uses different forward and reverse algorithms to compute the forward and reverse deltas.

It is still a further object of the present invention to restore any requested file if it is located on-site by recovering the current version and subtracting the appropriate reverse deltas therefrom until the requested file is produced, or if the document is off-site, by recovering the baseline version and adding the appropriate forward deltas thereto until the requested file is produced.

SUMMARY OF THE INVENTION

Set forth below is a brief summary of the invention in order to achieve the foregoing and other benefits and advantages in accordance with the purposes of the present invention as embodied and broadly described herein.

The present invention is briefly summarized in the following steps:

1. At time1 inventorying all files on-site on a selected hard drive inventory path of a database,
2. Calculating and assigning to each on-site file a hexadecimal signature which identifies each file in the database,
3. At time2 repeating steps (1) and (2) for each file and comparing the previous signature to the current signature to determine whether anything about the file has been changed in any way, or whether old files have been deleted or new files added
4. Comparing the current version of a changed file to the last previous on-site version of the changed file,
5. Computing the differences between the two versions by different forward and reverse algorithms to provide a forward delta [last previous+delta=current] and a reverse delta [current−delta=last previous],
6. Storing the current version and the reverse delta of the changed file on-site while deleting only the last previous on-site version of the changed file,
7. Repeating steps (4)–(6) for each changed file, and
8. Permanently storing off-site the forward deltas of each changed file and a baseline copy of each new file, 9. Restoring any requested file,
   if on-site, by recovering the current version and subtracting the appropriate reverse deltas therefrom until the requested file is produced, or
   if off-site, by recovering the baseline version and adding the appropriate forward deltas thereto until the requested file is produced, Further features of the invention include
   a. issuing a "deleted file" warning as to any previously inventoried file not found on a next succeeding inventory pass,
   b. issuing a "possible corruption" warning during inspection passes as to any file whose signature has changed,
   c. capturing predetermined files or groups of files at predetermined times,
   d. issuing an "unidentified possibly valuable asset" warning as to changed files not previously inventoried nor on a predetermined ignore table,
   e. encrypting files stored off-site.

Benefits

The advantages of this process and apparatus are many. Most notably, the advantages include
1. Enhanced comprehensive identification, control, protection, and management of critical hardware, software, and data business assets.
2. Enablement of a unique strategy for taking inventories of hardware, software, and data at each workstation at desired frequencies.
3. Customized automated back-up for disaster recovery includes intelligent capture and compression which significantly reduces the amount of data stored on-site or encrypted and permanently stored off-site while providing complete and effective back-up of all data.
4. Tracking of all file additions, changes, re-names, moves and deletions and other user activity.
5. Rapid restoration on-site of any historical version via independent reconstruction of saved on-site or offsite components.
6. Reduced costs.
7. Increased productivity.

BRIEF DESCRIPTION OF THE DRAWINGS

FIG. 4 is a simplified flow chart of the process of Retrieving Historical Files From The Vault Archives of the present invention at level 2.9.00.

FIG. 5 is a simplified flow chart of the Scribe Process of the present invention at level 2.4.00.

FIG. 7 is a simplified flow chart of the Software Communications at the Client Akashic Vault of the present invention at level 2.7.00.

FIG. 8 is a simplified flow chart of the Library Process of the present invention at level 3.1.00.

FIGS. 9 and 10 are simplified flow charts of the Capture Library Storage process of the present invention at levels 3.4.01 and 3.4.08.

FIGS. 11 and 12 are simplified flow charts of the Library Shopping Scanner Process of the present invention at level 3.5.01 and 3.5.04.

OVERVIEW OF THE PRESENT INVENTION

Figure 1:
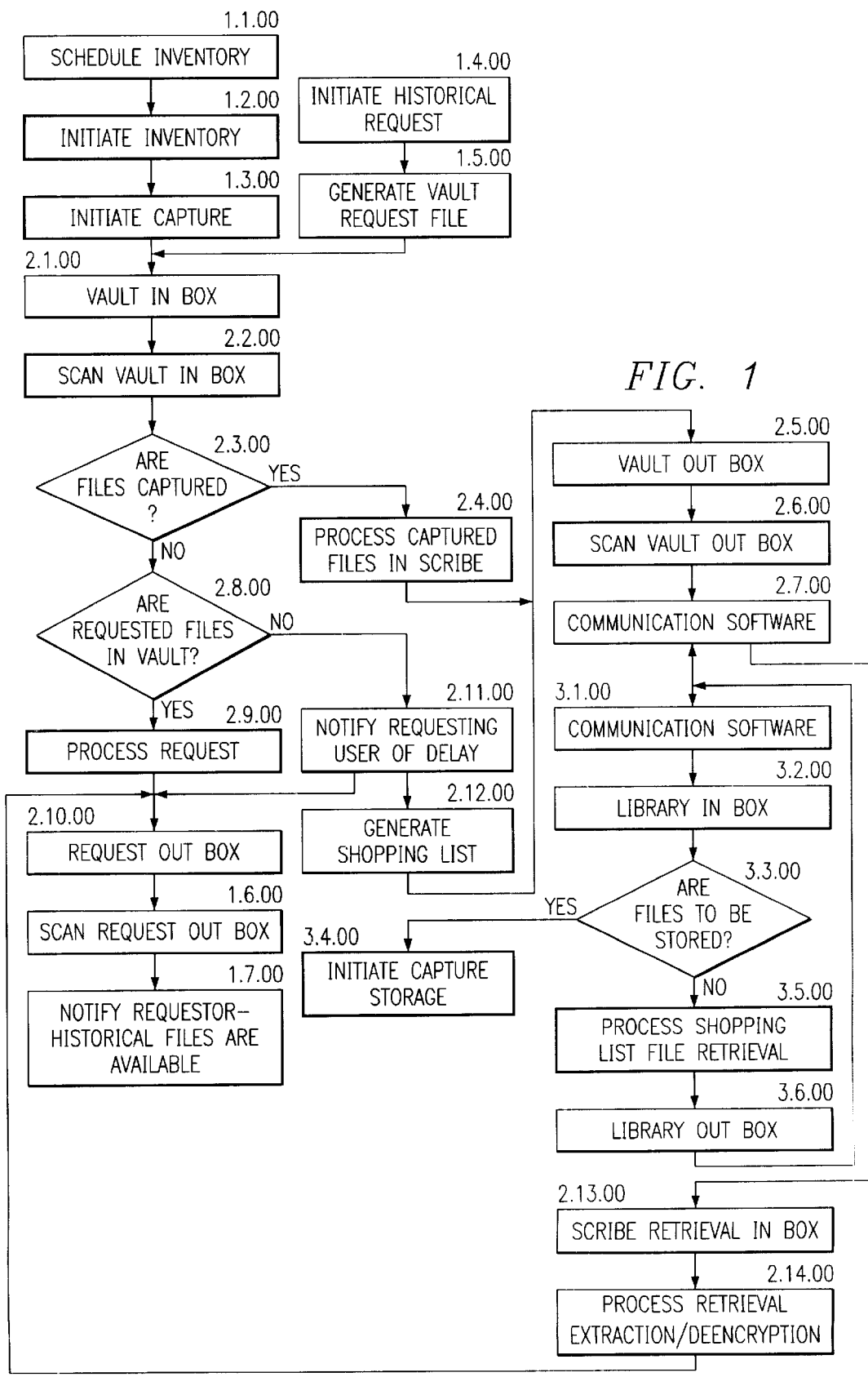
FIG. 1 is a simplified flow chart of the top level process employed in the present invention at level 1.0.00.
Figure 2:
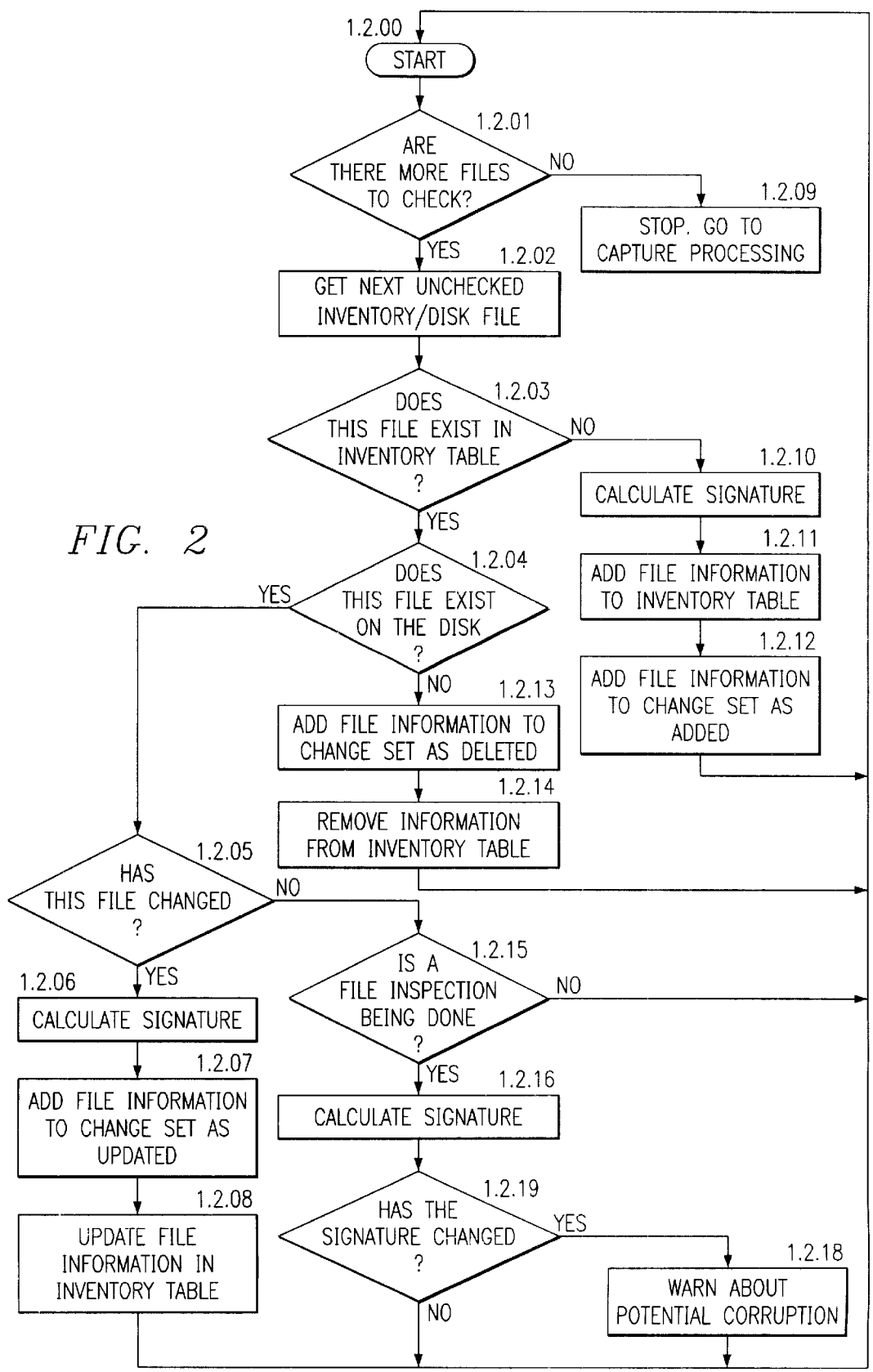
FIG. 2 is a simplified flow chart of the inventory processing steps of the present invention at level 1.2.00.
Figure 3:
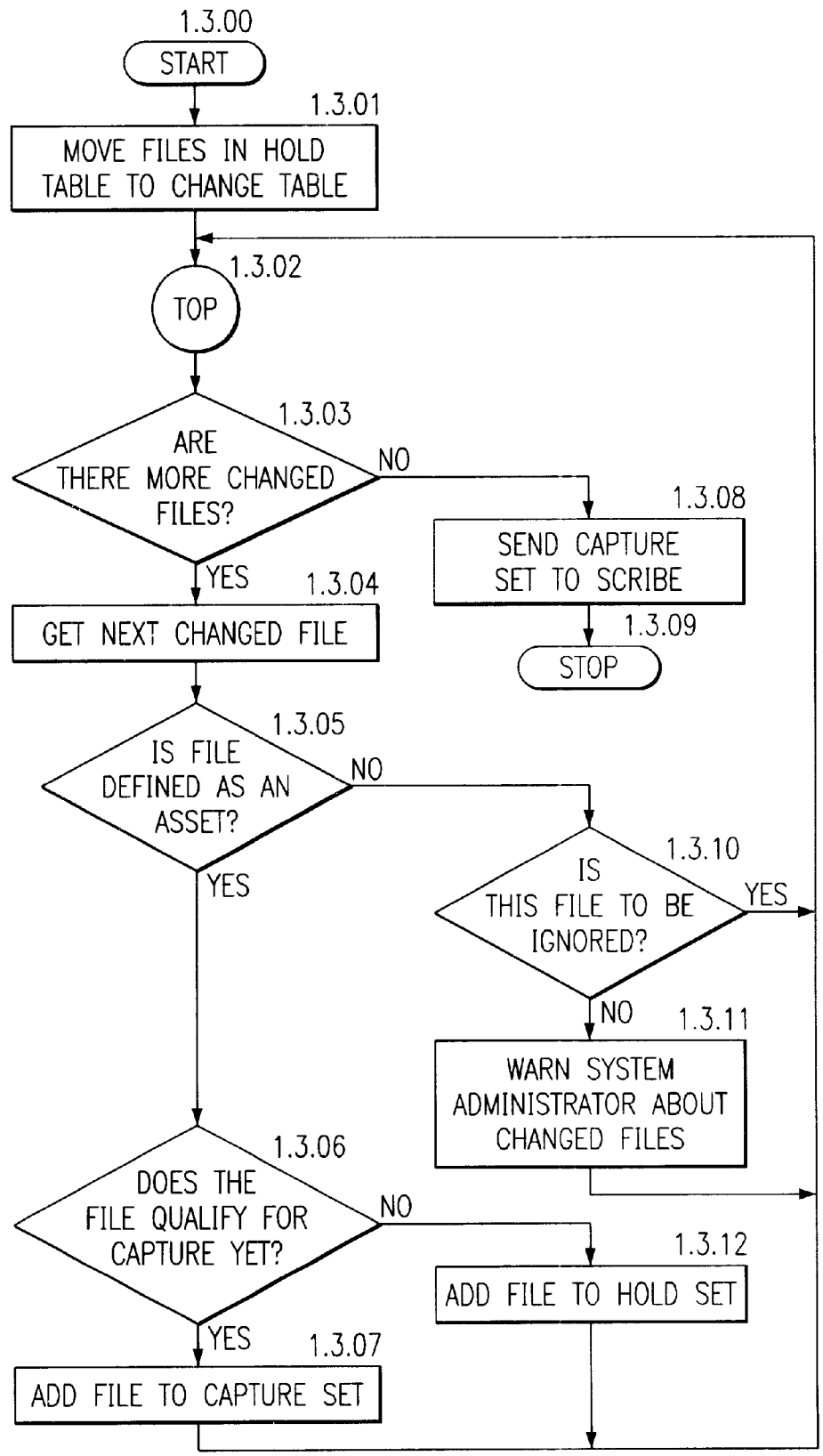
FIG. 3 is a simplified flow chart of the Akashic File Clerk Capture Processing steps of the present invention at level 1.3.00.
Figure 6:
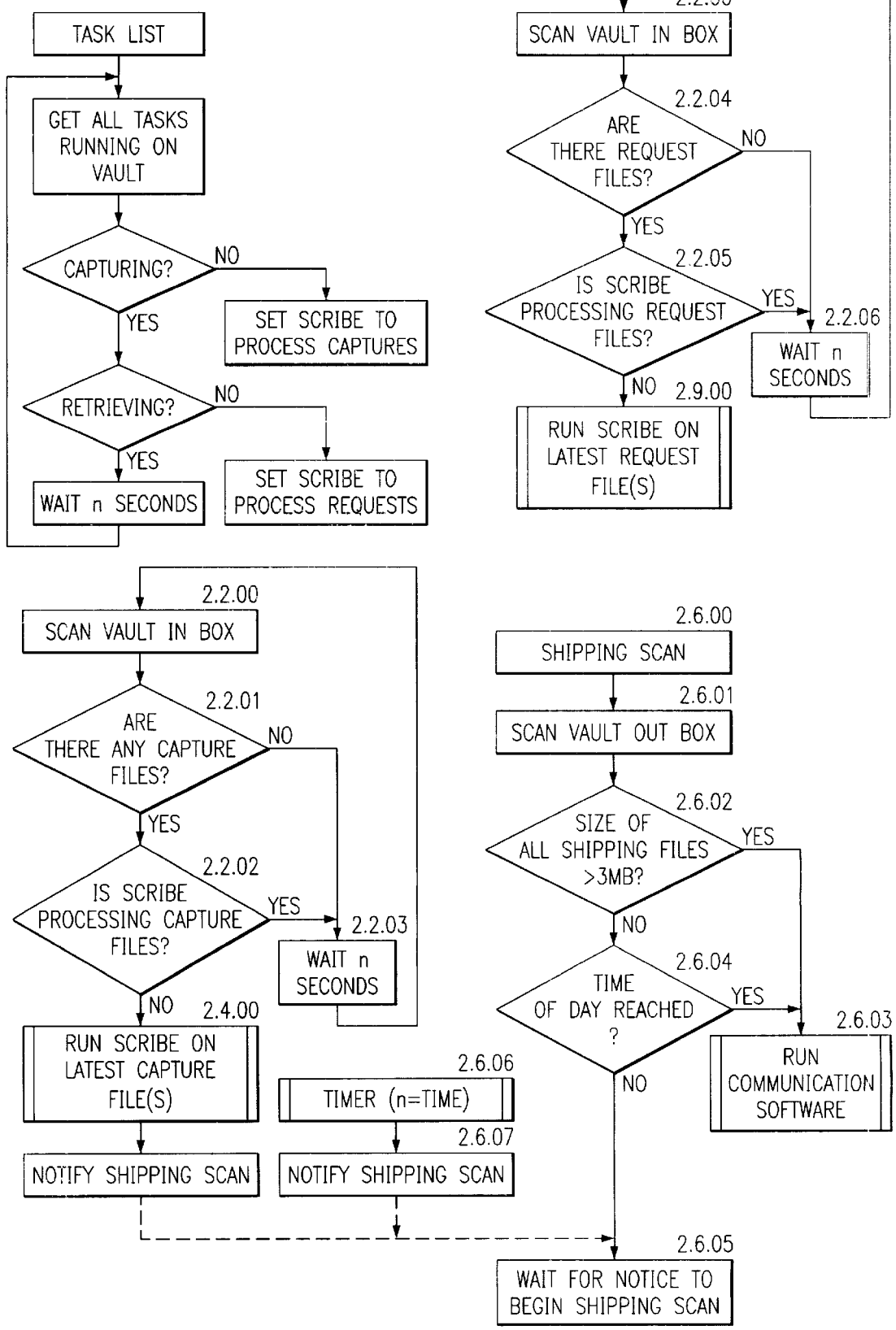
FIG. 6 is a simplified flow chart of the Scribe Scanner Sweep Functions and Process of the present invention at levels 2.2.00 and 2.6.00.

In summary, the Intelligent Data Inventory and Asset Management ("IDIAM") System of the present invention comprises the following steps:

1. As seen in FIG. 2, inventorying initially and at scheduled intervals according to predetermined Tasks assigned to predetermined groups of files in a Host (on-site) system selected ones of a plurality of hardware, software, and data files in the system by
   a. creating a Hard Drive Inventory Path setting for all files residing on a predetermined hard drive to be inventoried,
   b. comparing each file on the Inventory Path to an Inventory Database to determine if the file exists from a previous inventory,
   c. if not, calculating a hexadecimal signature (file path, name, size, date and time of last file save) for the file which identifies the file in the database and adding the file to an Inventory Database and to a Change Set Database,
   d. if the file exists in the Inventory Database but does not exist in the Hard Drive Inventory Path, identifying the file as deleted in the Change Set Database and a Historical Archive and deleting the file from the Inventory Database,
   e. if the file exists in the Inventory Database and is also in the Hard Drive Inventory Path, comparing the previous signature to the current signature to determine whether the file has been changed,
   f. if the file has changed, generating a new signature and updating the Change Set and Inventory Databases,
   g. if the file has not been changed, optionally inspecting each file in the Inventory Path by generating a new signature for each file and comparing the new signature to the previous signature and issuing a warning of potential corruption as to each file whose signature has been changed.
2. As seen in FIG. 3, processing each changed file in the Inventory Path for capture by,
   a. moving to the Changed Set Database all files previously added to a Temporary Hold Table during a prior capture process,
   b. initially evaluating each file in the Change Set Database for capture according to a predetermined qualification set and copying the qualified files to a Capture Set Database (in a temporary directory in an archive format),
   c. providing a predetermined Data Asset Table identifying those files by prioritized Capture Category that must be captured and providing a predetermined Ignore Table identifying those files of no interest,
   d. Comparing each file in the Change Set Database to the Data Asset Table and,
      (1) if the file is not on the Data Asset Table further comparing the file to the Ignore Table and issuing a warning if the file is also not on the Ignore Table (i.e., the file may be an unidentified, but valuable, Data Asset), e. further evaluating each file in the Change Set Database to determine whether it is scheduled for capture by comparing its Capture Category to the Data Asset Table Capture Category identified for the inventory in progress and,
   (1) if so, (i.e., equal to or greater than) placing a copy of the file in the Capture Set for further processing in a Scribe Processor and,
   (2) if not, (i.e., less than) placing the file in the Hold Table for capture at the appropriate inventory,
3. Providing a Requested File identifying a user request for retrieval of a selected file (one or more) identified in the Historical Database.
4. As seen in FIG. 1, continuously Scanning a Request Out Box waiting for a Send File containing a retrieved file identified in the Requested File to appear from an on-site Vault or an off-site Library, and notifying the user upon recognizing the presence of said Send File.
5. As seen in FIGS. 5 and 6, processing each Capture Set file and each Requested File in a Scribe Processor by:
   a. waiting while allowing the Scribe to finish processing any previous Capture Set or Requested File, then, when the Scribe is not busy,
   b. scanning a Vault In-Box for the presence of a Capture File or a Requested File,
   c. As to a Capture File in the Capture Set:
      (1) if the Capture File does not exist in the Vault Historical Archive (New File), saving the New File in the Vault Historical Archive,
      (2) if the Capture File exists in the Vault Historical Archive, removing the Latest Version of the Capture File available in the Vault Historical Archive,
      (3) comparing the Capture File (Current Version) and the Latest Version, and
      (4) computing the differences between the two versions to provide a Forward Delta and a Reverse Delta wherein
         (a) the Forward Delta is that difference between the Latest Version and the Current Version which when added to the Latest Version will produce the Current Version, and
         (b) the Reverse Delta is that difference between the Latest Version and the Current Version which when subtracted from the Current Version will produce the Latest Version,
      (5) Storing the Reverse Delta and the Current Version in and deleting the Latest Version from the Vault Historical Archive,
      (6) Repeating the above steps (1)–(5) as to each file in the Capture Set,
      (7) Encrypting all Forward Deltas (of old files) and all New Files (Baseline Files) (together with optional Reverse Deltas) (individually or collectively as determined at time of installation) in a Container (whose Key is available to Library) with a Shipping Archive (container identification and file header information for cataloging and locating at Library permanent storage),
      (8) Placing in the Vault Out-Box the Container and any Requested File not in the Vault Archive,
6. As seen in FIGS. 4 and 6, if the Request File is in the Vault Historical Archive, copying the Latest Version thereof in the Vault Historical Archive, subtracting the proper ones of the Reverse Deltas from the Latest Version to produce the Requested File, Sending an equivalent (Send File) of the Requested File to the Request Out-Box.
7. As seen in FIGS. 1 and 4, if the Requested File is not in the Vault Historical Archive, notifying user the Requested File is being obtained from an Off-Site Library, and sending to the Vault Out-Box a Shopping List identifying the Requested File in the Library Database.
8. As seen in FIG. 6, scanning the Vault Out-Box for the presence of Shipping Files (Shipping Containers (of Captured Files) and/or Shopping Lists (of Requested Files)) to be sent to the Off-Site Library, and initializing communications software when a predetermined set of initiation criteria (size, time, and files present) have been satisfied.
9. As seen in FIGS. 1 and 7, establishing a secure (password timely validated) communications link with the Off-Site Library, transmitting the Shipping Files to the Off-Site Library, receiving, if any, incoming Requested Files downloaded from the Library Out-Box, disconnecting the communications link, and depositing any received incoming Requested Files in a Scribe In-Box.
10. As seen in FIG. 1, scanning the Scribe In-Box for the presence of incoming encrypted Requested Files, upon detecting the presence of said encrypted Requested Files, unencrypting and adding the Baseline File and any included Forward Deltas to produce the Requested File, and sending the Requested File (Send File) to the Request Out-Box.
11. As seen in FIG. 8, Validating log-in (password timely validated) of the incoming call and setting the Library In-Box corresponding to a Vault Identification in the incoming call, receiving the incoming Shipping Files, sending any outgoing Requested Files present in a Library Out-Box for the same Vault identification, and placing the incoming Shipping Files in the Library In Queue with the Vault Identification.
12. As seen in FIGS. 9,10, Scanning the Library In Queue, detecting the presence of a Shipping Container therein, un-encrypting the Shipping Container and extracting the New Files and forward Deltas (and optional Reverse Deltas) therefrom, updating a Client Library Database (file names and storage location in Library), copying the files to a Library Burn Directory, adding to a Library Burn Queue all files from the Library Burn Directory up to a set limit smaller than the unused media storage capacity if the size of the Burn Directory is greater than the size of the unused media storage capacity and creating a new Burn Directory to receive new files and repeating the previous steps above, further scanning the Burn Queue for the presence of files to be recorded and, when said files are detected, recording said files in the permanent Library storage media with file identification, deleting the just recorded Burn Directory, and asking the storage attendant for new media to be placed in the storage device (the old media is now full).
13. As seen in FIGS. 11,12, scanning the Library in Queue for a Shopping List, detecting the Shopping List and extracting the Requested File information therefrom, updating the Shopping Queue with the extracted information, scanning the Shopping Queue for the presence of the extracted information, and, when the information is detected, identifying the media location of and selecting the media device (Compact Disk Juke Box[1]) where the Requested Files (Baseline and Forward Deltas) are stored, and copying the Requested Files to the Library Out-Box.

DETAILED DESCRIPTION OF THE PREFERRED EMBODIMENT

IDIAM System Functional Description

I. Introduction Overview

II. File Clerk Data Inventory Management

III. File Corruption/Virus Infection

IV. Akashic Vault

V. Communications

VI. Library System

VII. Software Inventory/License Tracking

VIII. Hardware Inventory

IX. System Administration/Reporting

I. Introduction Overview

The IDIAM System Functional description set forth below[1]

[1] Alternatively, tape or other electronic memory media may be used. provides a description of the major functions and options of the IDIAM (Intelligent Data Inventory and Asset Management) software system. As best seen in FIG. 1, the overall software system comprises:

A. The Akashic File Clerk resides on each network workstation/server. The File Clerk maintains an inventory database containing unique signatures for every file on a work station (during the initial installation inventory) and also all new and changed files. The File Clerk allows the client to determine those files that are critical to their particular business function and capture only those files that are important enough to be captured. Inventories are then run at scheduled intervals to identify and capture new and previously captured files that have changed. All captured files are forwarded to the Akaskic Vault for storage and processing.

The File clerk also provides the user with a retrieval function, which allows historical files to be requested from the Vault and deposited in the original location, a default retrieval directory or the users choice. Because all file captures are historical, all retrievals can be selected on a point-in-time basis. Because the Vault is a node on the client's network, retrievals are very quick, and require minimal network traffic.

B. The Akashic Vault is a computer that is attached as a node to the client's network. The Vault stores captured files using intelligent compression technology. This Intelligent Compression technology allows the Vault software, referred to as the Akashic Scribe, to store multiple historical file versions in a highly compressed state. Therefore, the Akashic Vault becomes a very efficient storage and retrieval mechanism for massive quantities of data that would normally not be available, without high capacity storage devices. At regular intervals, the Vault sends copies of the latest file captures to an offsite Library system. The system is designed to transmit the data offsite using commercial phone lines. Data may be encrypted depending on the client needs. The offsite Library may be maintained by the client.

C. The Library system (data center) catalogs each client transmission and records the encrypted transmission contents onto Write Once Optical Storage Disks. These disks are intended to be stored in a Juke Box Reader which allows ready retrieval of the transmission contents. A request for data retrieval is sent to the client and decrypted by the client using the client's encryption key.

II. File Clerk Data Inventory Management Functions. With Reference to FIG. 2

A. Initial Work Station/Server Inventory

Inventory and identify all files on a workstation/server hard drive by path, file name and file type including hidden DOS files and including the additional parameters:

1. Date last changed
2. Time last changed
3. File Size
4. Attribute setting
5. 32 bit CRC Insert initial inventory in the File Clerk database installed on the workstation/server. The File Clerk database maintains a running history of all files on the hard drive.

B. Subsequent Scheduled Inventories

The File Clerk performs scheduled inventories requested by the client in the Data Asset Description and File Clerk functions. Using the information in the initial and subsequent previous inventory as a reference:

Files are identified that have:

1. Changed since the last inventory
2. Been deleted since the last inventory
3. Been added since the last inventory C. Historical Signatures Using the information gathered in each scheduled inventory generate new historical signatures for each file that has met the criteria of II.B. above. Refresh database for future reference, maintain historical information for retrieval later.

D. User Defined Functions:

System Administrator/User at each work station/server enters the following attributes:

1. Data Assets that require "capture" on a periodic basis, by:
   a. Importance to the business operations (required). The level of importance is required to establish the data files that will be captured at specific scheduled inventories by the file clerk. It is required for all files required to be captured, whether their importance is high or low.
   b. Software program used to generate the file (option). This option allows data files to be captured by their level of importance relative to the general topic of software program used to generate the data file. This allows for capture scheduled at generic level of importance relative to all files generated by a given program and retrieval of an individual file by program name (Word, Excel, Corel Draw, Power Point, etc.).
   c. File Name (option). This option allows single data files to be captured individually by their level of importance. This option is typically reserved for critical database files; however, may be used for other important files.
   d. Topic or Event Description (option). This option allows groups of files that should be captured together, meaning the topic which may be a project, task, case, etc. has a significance level tied to those data files associated with the topic. Capture of file changes as defined by B. above allows all files related to that topic to be captured as well as retrieved by that topic. In addition, specific point-in-time events may be tied to the historical version of the files grouped by topic when that event is entered into the File Clerk.
   e. Directory/Path Name (data files not included will not be captured)
   f. File Name
   g. File Type (specific files types may be included or excluded)

2. Frequency of inventory and capture:

Each of the files/groups of files defined in II.D.1.a. through g. above. Job descriptions are assigned to each of the scheduled inventory/captures. Schedules are assigned by month, week, day, or hour and by start time.

3. Data/software assets that are not required to be captured; however, should be inventoried using exclude lists for directories, file types, etc.

E. Using the information entered by the user for each file/file group and scheduled inventory/capture, initiate inventory capture as requested using the following processes:

1. Run inventory/capture as requested to identify all attributes (changed, deleted, or added), capture/copy all files that have been changed, or added. Generate historical signatures.

Transmit the captured files to the on-site Vault.

Identify all changed or added executable files that do not match authorized file signatures.

2. Place new historical signatures in workstation File Clerk inventory database.

3. Update file status on the on-site Vault data asset database. Insert captured files into Vault archive and perform the following: See IV. Akashic Vault Function.

III. File Corruption/Virus Infection Function. With Further Reference to FIG. 2

A. Perform initial full hard drive scan of every byte on the hard drive file-by-file, generate historical signature as noted in II.A above, referred to as a file inspection. Place signature information in the workstation inventory database.

B. Perform additional file inspections as determined by the client/user and entered in the File Clerk Job Description. Recommended no more than once per day but no less than once per week.

C. Use signatures of changed files to identify files that have changed by comparing to the previous signature in the File Clerk database. If any executable files have changed, the condition is identified as file corruption and a possible virus situation.

IV. Akashic Vault Function. With Further Reference to FIGS. 2–6

A. Storage and Shipping (FIG. 5):

1. Store latest version of captured files by historical signature:
  a. Identify files as new files and build new compressed archives for each.
  b. Identify changed files that have been previously archived. Compare the changed file to the latest previously archived file. Generate a reverse delta. Deltas are the difference between the latest archived version and the latest changed version from the work station. Reverse deltas when subtracted from the latest archived version will produce the appropriate earlier version of the file. Generate a forward delta immediately following the reverse delta. Forward deltas are the difference between the original and latest file that when added to the original will create the latest file. Archive the reverse delta, delete the previous latest version and archive the newest compressed version of the file.

2. Generate Files to be sent to the Library:

Using the forward delta(s) generated in IV.A.1.b. above and copies of new file archives from IV.A.1.a. above. above generate a compressed shipping container file.

3. Generate encrypted shipping container and place in the Vault Out Directory.

B. Restoration (FIG. 4):

1. Receive requests from each workstation for archived files by historical signature.

2. Recognize historical signature and retrieve from archive by copying requested version. The requested version may be an earlier version than the latest stored full version, if so subtract the required reverse deltas from the latest full version.

3. Place requested file in the Akashic Vault Retrieve Directory. Initiate retrieval program to allow retrieval into original location, default retrieval directory, or the users choice.

4. If file is unavailable in Vault archive, place request in Vault "Out" Directory.

5. Decrypt files (if necessary) requested from the off-site Library Vault when returned, remove the required forward delta(s)and original file(s). Generate the requested version by adding the appropriate forward deltas to the original file. User determines where the retrieved file will be placed, as noted in IV.B.3. above.

V. Communications. With Reference to FIGS. 1,6,7

A. Schedule and transfer shipping containers to Library system for storage:

1. Identify the presence of shipping archives in the Vault Out Directory and do the following:
  a. If the phone line used by the client is dedicated to the client on-site Vault, ship the archive to the Library by dialing the Library using security process to gain access. If Library is busy, hang-up and redial at scheduled intervals until the transmission goes through. Place the shipping archive in the Library Client In Directory.
  b. If the phone line used by the client is not dedicated, establish default dial out times to perform the following:

If shipping archives are present determine available time window, if time window is open, transmit. If window is not open wait, when window opens transmit. If Library is busy, hang-up and redial at scheduled intervals until the transmission goes through. Place the shipping archive in the Library Client In Directory.

B. Transmit requested files to be returned to the client. Upon complete transmission to the Library, check the Client Out Directory for shipping archives going back to the client. Transmit files to client, place files in the on-site Vault In Directory. Hang-up upon completion of transmission.

VI. Library System. With Reference to FIGS. 8–12

A. Process Client Shipping Archives (FIGS. 8–10):

1. Upon receipt of incoming client shipping archive (identified by arrival in the client's In Directory on the Library) Strip client identifiers, historical signatures and unencrypted hardware data and event logs from the shipping container and deposit in client database. Move shipping container to the Burn Center.

2. Burn Center tracks the addition of shipping containers associated with Compact Disk (CD) to be recorded. Upon reaching maximum allowable size, record CD. Upon completion of recording, delete original files to free up recording wait area.

3. While wait area is full or in the process of recording a CD, send all new containers to additional recording wait area 2, 3 and so on. Record CDS when available.

B. Retrieve Client Shipping Containers (FIGS. 11–12):

1. Upon receipt of retrieval request in a client shipping container, commence search of client data base to locate shipping containers that contain the requested data.

2. Retrieve copies of applicable shipping archives from the CD Juke Box and place in the client Out Box on the Library.

3. Transmit requested archives from the Out Box to the client at the next communications opening with the client (next time shipping containers are sent to the Library). After shipping containers are deposited transmit Out Box contents to the client.

VII. Software Inventory/License Tracking Functions (Optional)

A. Baseline Software Inventory

Establish client software inventory at time of initial installation by comparing installed software inventory to known software product inventory signatures. Identify location by machine, drive, directory, etc. using historical signatures.

B. Product Installations

All new product installations (post baseline) should be processed through the Software Product Register. This process registers the software, license, and location in the authorized software database. Inventories are run immediately prior to and after installation to establish historical signatures and location.

C. Unauthorized Installations

All new software product installations that are not installed using the authorized installation feature will be identified immediately after the next scheduled inventory.

The system administrator may at their discretion (or management's authorization) initiate a Hold process on the product's executable files which renders them inoperable. Upon determining whether the newly installed product is licensed and authorized for installation or not, the system administrator has the option to release the hold or Disable the product completely. Authorized installations are then added to the product register.

VIII. Hardware Inventory Functions (Optional)

A. Inventory

Hardware inventories are run by each workstation/server file clerk during the initial installation inventory and all subsequent inventories. These inventories identify major hardware components available specification installed on that workstation/server. Changes to hardware are identified during each new inventory scheduled by the file clerk. This information is stored on the file clerk database, the on-site Vault database, the Library database, and a system administrator database. Each is refreshed at each new inventory.

B. Retrieval

Information retrieval is available to the system administrator through the system administrator's database during normal operation of the system. In the event of a physical disaster at the client's facility, (such as a fire, natural disaster, theft, etc.) the same information is available from the Library. The hardware information is sufficient to redesign the previous system (prior to the disaster) to facilitate ease of disaster recovery.

IX. System Administration/Reporting Functions

A. The system administrator has access to all inventory information from all work stations and can administer management functions accordingly (as directed by management).

1. Set capture importance and scheduling
2. Set captures parameters (includes and excludes)
3. Hold and Disable unauthorized software product installations
4. Determine workstation activity by name and extension type.
5. Request reports identifying inventory information, such as:
   a. Files added, changed, deleted, on a given work station, by date and time.
   b. File size and change size
   c. Hardware Inventory information and changes
   d. Installed location of software products and associated licenses and versions.

IDIAM System Process Steps Description

As seen in FIG. 1, the process begins by scheduling an inventory.

1.1.00 Schedule Inventory

Inventories are taken initially when the IDIAM System is installed and subsequently on a regularly scheduled basis. The following process is used to schedule inventories subsequent to the initial baseline inventory:

Frequencies are established by defining the frequency and timing of individual tasks. One (1) to ten (10) tasks can be assigned different frequencies and different start times. Each of these tasks is assigned to a group of files to be captured. Tasks may be assigned to more than one group of files to be captured. Each task initiates independently of each other. These tasks may be scheduled to run:

hourly multiple times per day (every N hours)

once per day, every day of the week selected days may be chosen (every Monday, Wednesday, and Friday, for example)

Once per week, or selected weeks

Once per Month, or selected months

As seen in FIG. 2, inventory processing includes:

1.2.00 Initiate Inventory

The process identified in flow chart 1.2.00 is used for both initial and subsequently scheduled inventories. The inventory process looks at each and every file residing on a given hard drive path on which the Akashic File Clerk (AFC) has been installed and which file has been included in the inventory drive path setting. For example, the AFC could be installed on a workstation or server hard drive identified as Drive C; however, the AFC could be set to perform inventories on partitions of the C drive known as D, E, or F, etc. and not on C. Each time the inventory is run it performs the following processes identified in flow chart 1.2.00:

1.2.03 Compares the AFC Inventory database with each file on the inventory path and determines if the file exists from a previous inventory. If it does not exist a historical signature is generated which identifies that file within all AFC databases. The following additional information is also gathered:

File Path

File Name

File Size

Date and Time of Last File Save 1.2.04 If the file exists in inventory, but does not exist in the hard drive inventory path (disk) then the file was deleted since the last inventory and is identified as deleted in the Change Set and Historical (each on the AFC) databases and deleted from the Inventory database.

Important Note:

Each time an inventory is run it refreshes the Inventory database from the previous to the latest, a new Hold and Change Set database is created from each inventory and all Change Set Information is added to the Historical database.

1.2.05 If the file exists in inventory and on disk the inventory compares the previous inventory information to the current information and determines if the file has changed. If the file has changed a new signature is generated and the databases are updated.

1.2.15 If the file existed previously and no changes are indicated the inventory determines if a File Inspection is to be run. File Inspections generate new signatures for all files in the inventory path and compares the old signature to the new signature. If any executable file signatures have changed a warning is sent to the appropriate workstation to identify potential software corruption.

Next, comes Capture Processing in the Akashic File Clerk as seen in FIG. 3 including:

1.3.00 Initiate Capture

Upon completion of each inventory the following processes identified in flow chart 1.3.00 are run. Note: Some process blocks identified in 1.3.00 do not require definition and are not defined below.

1.3.01 All files added to the temporary Hold table during the inventory are moved to the Change Set table.

13.02 Each file in the Change Set is evaluated for Capture.

Upon completion of the capture evaluation the files qualifying for capture are copied and placed in a Capture Set. Capture sets may be one or many files which have been copied into a temporary directory and placed into an archive format that is recognized by the Akashic Scribe software.

1.3.05 Each file is compared to previously (user/client) defined tables (known as data assets) identifying the file either by name, path, or extension variables as needing to be captured. If it has been identified, it is further evaluated for capture time under 1.3.06. If it is not defined as a data asset, it is compared to the Ignore Table. This previously defined table is used to ignore those files that the user/client are not interested in. If the file is not in the Ignore Table, then-a warning is sent to the System Administrator or other designated person (defined at time of IDIAM installation). This warning identifies that files are changing that are not identified as a data asset. The files are also not flagged as unimportant in the Ignore Table; therefore, these new or changed files may be unidentified data assets. The files should be investigated to be included in a data asset table.

1.3.06 The file is compared to the Data Asset Table Capture Category to determine if the file is scheduled to be captured during the inventory in progress. If so, the file is copied and placed in the capture set. If not, the file inventory information is placed back in the Hold Table for capture at the appropriate inventory. Of special note: If the capture category is equal to or greater than the category specified for the inventory in progress, it is captured. If it is a lower category than that being run on the current inventory, then it is placed in the Hold Table.

Referring to FIG. 1:

1.4.00 Initiate Historical Request

The user/client is given the ability to graphically interface with the Historical database. This interface is arranged in the same manner as the data asset tables to enhance the user/client memory process. To explain, users are more likely to remember special topics, events, or software used to generate a file (needed from history) than they are the individual file. Therefore, based upon the user s selection of a given data asset category they will be provided with a selected group of captured historical files identified in the Historical database. From this interface the user may select single or multiple files to request from history in the Akashic Vault.

1.5.00 Generate Vault Request File

Upon selecting historical files for retrieval, information contained in the Historical database is placed into a Request File. The Request File is formatted in a manner recognized by the Akashic Scribe software to enable processing by the scribe.

1.6.00 Scan Request Out Box

Scan software resident on the local workstation initiates upon generation of a Request File from the user/client on that particular workstation. The software periodically scans the Request Out Box waiting for files retrieved from the Akashic Vault or the Library. Upon noticing the presence of the historical Send Files the scan software issues a notice (1.7.00) to the user that historical files are available.

2.1.00 Vault In Box

The Vault In Box is a repository (physically located at the client s discretion somewhere on the network, this can be the Akashic Vault or the Client s server, etc.)for all Capture and Request Files from each Akashic File Clerk.

2.2.00 Scan the Vault In Box

Scanner software located on the Akashic Vault periodically scans the Vault In Box looking for the presence of Capture or Request files. This software also determines if the Akashic Scribe is currently processing Capture or Request files. If the Scribe is busy the scan software does nothing until the next scan. If the Scribe is not busy the scan software initiates the Scribe to process the Capture or Request File(s) as appropriate.

Referring to FIG. 5, the Scribe Process includes:

2.4.00 Process Captured Files in Scribe 2.4.01 Evaluate Capture files. Does the file exist in the Akashic Vault archive? If Yes, go to 2.4.02. If No, go to 2.4.05.

2.4.02 Remove the latest version available in the vault archive and go to 2.4.03.

2.4.03 Compare the Capture file and the version removed from archive. Compute the differences between the versions to produce a Forward Delta and a Reverse Delta. These deltas represent the following:

Forward deltas are the difference between the latest version in archive and the current captured version that when added to the archived version will produce the current captured version.

Reverse deltas are the difference between the current captured version and the latest archived version that when subtracted from the captured version will produce the appropriate earlier version of the file.

Go to 2.4.04

2.4.04 Place the Reverse Delta in the vault archive. Go to 2.4.05

2.4.05 Place the latest captured file into the vault archive. Go to 2.4.06

2.4.06 Delete the previous archived version used for the comparison in 2.4.03. Go to 2.4.07

2.4.07 Determine if the customer has requested that copies of Reverse Deltas be sent off-site. (2.4.08) If so, process copies of the reverse deltas in 2.4.09. This option will produce quicker historical restorations when these files ever need to be requested from the off-site Library.

2.4.09 Encrypt all Forward Deltas, new files and all optional Reverse Deltas using commercially available encryption methods and an encryption key available only to the client. Encryption may be performed individually on each delta/file or on all deltas/files at the same time. This process is determined at the time of IDIAM installation. If deltas/files are encrypted individually, go to 2.4.10.

2.4.10 Encrypt all individual files in a single encrypted container. The Key to this container is available to the Library and provides additional protection while the container is in transit from the client s Akashic Vault to the Off-Site Library. Go to 2.4.11.

2.4.11 Generate a shipping archive consisting of the encrypted shipping container and the client file header information used by the Library to catalog each encrypted file and delta location in the Library a permanent storage. Place the file in the Akashic Vault Out Box (2.5.00)

2.5.00 Vault Out Box

The Akashic Vault Out Box is a repository for all outgoing captured files, captured deltas, and requests for historical files from the Library.

Referring to FIG. 6 The Scanner Sweep Function includes:

2.6.00 Scan Vault Out Box

Shipping Scanner software located on the Akashic Vault periodically scans the Vault Out Box looking for the presence of Capture or Request files to be sent to the Akashic Library. This software will be notified to run upon initiation of the capture process on the scribe. Upon determining if the right shipping file size has been reached (initially set at 3MB) or the set time of day has been reached and files are waiting to be shipped, the scanner initiates the communication software (2.7.00).

Referring to FIG. 7 the Communications software steps include:

2.7.00 Communications Software 2.7.01 Initiate Communications software. Go to 2.7.02.

2.7.02 Establish communications link to Off-Site Library (both modems or other transmission devices recognizing each other). Go to 2.7.03.

2.7.03 Present password from the client Akashic Vault to the Off-Site Library. Wait for validation from the Library. If not validated, present password a set number of times, if not validated within the setting hang up. Go to 2.7.05.

2.7.05 Upon validation from the Library, transmit all Shipping Files to the Library, and wait for 2.7.06.

2.7.06 Wait for any incoming historical request files to be down-loaded from the Library. Upon receipt of incoming files or notice of no incoming files from the Library, disconnect the communication link to the Library (2.7.07).

2.8.00 (FIGS. 1,4) Are Requested Files in Vault?

Initiate Scribe software. Determine if the requested historical file is in the Akashic Vault Archive. If so go to 2.9.00, if not go to 2.11.00.

Referring to FIGS. 1 and 4, the process of retrieving historical files from vault archives includes:

2.9.00 Process Request 2.9.01 Determine Historical file needed from archive. Copy latest file from archive.

2.9.02 Compute reverse deltas needed to subtract from the latest file version.

2.9.03 Subtract the appropriate deltas from the latest file version in sequence until the requested file version is reached.

2.9.04 Generate a Send File equivalent of the file requested from 2.9.03. Deposit Send File in the Request Out Box.

2.10.00 Request Out Box

The Request Out Box is a repository (physical location on network determined at time of IDIAM installation) for access by Workstations for retrieved historical files.

2.11.00 Notify Requesting User of Delay (FIG. 1)

Send a notice to the Request Out Box notifying the user that the file is not available on the local Akashic Vault and the file is being retrieved from the Off-Site Library.

2.12.00 Generate a Shopping List

Generate a list in a format recognizable to the Library as a request for historical information and providing the information necessary to identify the file(s) requested on the Library database.

2.13.00 Scribe Retrieval In Box (FIG. 1)

The Scribe Retrieval In Box is a repository for encrypted files retrieved from the Library which are needing to be deencrypted, and processed to achieve the desired file revision requested from history. All incoming files from the library are deposited here (physical location on the network is determined at the time of IDIAM installation).

2.14.00 Scan Retrieval In Box

Scanner software scans the In Box periodically waiting for incoming files. Upon notice of the presence of incoming files these files are processed by 2.15.00

2.15.00 Process Retrieval Extraction/Deencryption

Unencrypt baseline file and any included forward deltas. Extract the file and delta(s). Add the deltas to the baseline to achieve the requested historical revision. Send the requested file to the Request Out Box (2.10.00).

Referring to FIG. 8, the Communications software in the offsite Library further includes:

3.1.00 Communications Software on the Library 3.1.01 Initiate next available modem upon one or any number of modems being busy. Go to 3.1.02.

3.1.02 Incoming call received. Go to 3.1.03

3.1.03 Initiate Validation of the Log-In password supplied from the client s Akashic Vault. Go to 3.1.04.

3.1.04 Is the password valid? If Yes, proceed to 3.1.05. If no, return to password validation until password is accepted or number of invalid attempts is reached. If password is invalid, disconnect.

3.1.05 Set the client In Box based upon the vault identification provided with the incoming file. Go to 3.1.06

3.1.06 Receive all incoming files to the In Box provided in 3.1.05. Go to 3.1.07.

3.1.07 Upon receipt of all incoming files, check for files in the Library Out Box for the incoming client. Upon identification of outgoing files destined for that client send all outgoing files. Proceed to 3.1.08.

3.1.08 Proceed to 3.2.00.

Referring to FIG. 1, the Library process further includes:

3.2.00 Library In Box

The Library In Box is a repository located on the Library Network. This repository receives all incoming Storage Files and Shopping Lists. The incoming files are routed to the appropriate process either to store or retrieve files as noted in 3.3.00.

3.4.00 Initiate Capture

Referring to FIG. 9:

3.4.01 Scan the Library In Queue. If files are present proceed to 3.4.02, if not, continue to scan periodically.

3.4.02 De-encrypt shipping container (if necessary) and extract client file information. Proceed to 3.4.03.

3.4.03 Update the Client database with the client file information for the files being processed. This will include the files being processed in the Library s history and identify where the files are located in the Library. Proceed to 3.4.04.

3.4.04 Copy files to the Library Burn Directory. Proceed to 3.4.05.
3.5.05 Determine if the Directory size is greater than the recording media storage capacity. If yes, add all files up to a set limit, smaller than the media capacity to the Burn Queue. Proceed to 3.4.07.
3.4.07 Create a new Burn Directory to receive new files. Referring to FIG. 8:
3.4.08 Scan the Burn Queue for the presence of files to be recorded. If files are present proceed to 3.4.09.
3.4.09 Record these files to media along with the file identification for retrieval later from location information in the Library Client database. Proceed to 3.4.10
3.4.10 Delete just recorded burn directory. Proceed to 3.4.11.
3.4.11 Ask recorder attendant for new media to be placed in recording device.
Referring to FIGS. 1 and 11
3.5.00 Process Shopping List File Retrieval
3.5.01 Scan Library In Box for Shopping List. If Shopping List is present proceed to 3.5.02.
3.5.02 Extract file information for shopping list. Proceed to 3.5.03.
3.5.03 Send information to Shopping Queue. Proceed to 3.5.04.
3.5.04 Scan Shopping Queue. If file requests are present proceed to 3.5.05, if not, continue to scan periodically.
3.5.05 Find files requested in Library database (baseline and all required forward deltas). Identify media location in Library. Proceed to 3.5.06.
3.5.06 Select media reading device (Compact Disk Juke Box, etc.), proceed to 3.5.07.
3.5.07 Locate requested files on media and copy files to the Library Out Box. Proceed to 3.6.00.
3.6.00 Library Out Box The Library Out Box is a repository for all outgoing client files requested from Library historical archives. Once files are transferred to this Out Box the process waits until the next down load from that client at which time they are sent to the client.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated.

We claim:

1. The computerized process of intelligently inventorying data and managing assets comprising:
   inventorying a plurality of files;
   determining a signature for each of the files;
   determining which ones of the files have changed based on the signature;
   storing a version of each file on-site;
   for each changed file, storing a change on-site;
   storing a version of each file off-site;
   for each of the changed files, storing a change off-site; and
   restoring a requested file by reconstructing the requested file by applying a stored change to one of the versions stored on-site or off-site.

2. The process of claim 1, wherein inventorying comprises inventorying a plurality of hardware, software, and data files.

3. The process of claim 1, wherein inventorying comprises identifying all of the hardware, software, and data files in a system.

4. The process of claim 1, wherein determining which files have been changed further comprises comparing current and previous signatures to determine whether any of the files has been added, omitted, or changed in any way.

5. The process of claim 1, wherein storing a version of each file on-site, storing a change on-site for each changed file, storing a version of each file off-site, and storing a change off-site for each for each of the changed files further comprises computing forward and reverse deltas for each changed file and saving the current version and reverse deltas on-site and the baseline version and forward deltas off-site.

6. The process of claim 5, further comprising repeatedly using the deltas and stored versions to recreate any requested version as it existed at any prior time.

7. The process of claim 5, further comprising restoring a particular version of the file by retrieving the original and a selected set of changes to reproduce the version.

8. The process of claim 5, wherein computing forward and reverse deltas further comprises comparing a historical and current version of a document.

9. The process of claim 1, further comprising deleting all prior file versions other than an off-site baseline version and an on-site current version.

10. The process of claim 1, further comprising storing only a baseline version of a document off-site with all forward deltas and saving only the current version of the document on-site with all reverse deltas.

11. The process of claim 1, wherein inventorying further comprises assigning a signature in hexadecimal format.

12. The process of claim 1, further comprising:
    computing the differences between a previous version and a current versions to provide a forward delta and a reverse delta;
    then, storing the current version and the reverse delta of the changed file on-site while deleting only the last previous on-site version of the changed file; and
    storing off-site only the forward delta of the changed file and a baseline copy of each new file.

13. The computerized process of intelligently inventorying data and managing assets comprising:
    periodically inventorying a plurality of files by assigning a signature to each file;
    determining sing which ones of the inventoried files have been changed;
    computing the differences between the previous and current versions to provide a forward delta and a reverse delta, wherein said computing uses different algorithms to compute the forward and reverse deltas;
    storing the current version and the reverse delta of the changed file on-site while deleting only the last previous on-site version of the changed file;
    storing off-site only the forward delta of the changed file and a baseline copy of each new file;
    restoring any requested file by reconstructing the requested file by applying selected stored changes to the current on-site version or the baseline off-site version.

14. The computerized process of intelligently inventorying data and managing assets comprising:
    (a) at time1 inventorying all files on-site on a selected hard drive inventory path of a database;

(b) calculating and assigning to each on-site file a signature which identifies each file in the database;

(c) at time2 repeating (a) and (b) for all of the files;

(d) comparing the previous signature of a file to the current signature of the file to determine whether the file has been changed;

(e) comparing the current version of a changed file to the last previous on-site version of the changed file;

(f) computing, using different forward direction and reverse direction algorithms, the differences between the two versions to provide forward deltas and reverse deltas;

(g) storing on-site the current version and the reverse deltas of the changed file while deleting the last previous on-site version of the changed file;

(h) storing off-site the forward deltas of the changed file;

(i) storing off-site a baseline copy of a new file; and (j) restoring any requested file:
  (i) if the requested file is on-site, by recovering the current version and subtracting the appropriate reverse deltas there from until the requested file is produced; or
  (ii) if the requested file is off-site, by recovering the baseline version and adding the appropriate forward deltas thereto until the requested file is produced.

15. The computerized process of intelligently inventorying data and managing assets comprising:

conducting an initial inventory of each file in a database, including calculating and assigning a signature to identify each file in the database;

comparing current and previous signatures to determine whether any of the files have been changed in any way;

as to each prior file which has been changed, computing forward and reverse deltas and saving a current file and reverse delta on-site while storing a baseline file and forward deltas off-site, using different forward and reverse algorithms to compute the forward and reverse deltas.

16. A computerized process of intelligently inventorying data and managing assets comprising:

repeatedly inventorying a plurality of files;

at each inventory after the first, determining which ones of the inventoried files had changed from previous versions of those files since the previous inventory;

during each inventory, identifying and storing a current version of each changed file and the changes since the previous inventory for those file on-site and a version of each changed file and the changes since the previous inventory for those files off-site;

computing a forward delta and a reverse delta for each changed file, using one algorithm to compute the forward delta and a different algorithm to compute the reverse delta, using a stored version in one of the deltas to construct a duplicate of the current version off-site;

storing the current version and the reversed delta at one of the locations consisting of off-site and on-site;

restoring any requested file by reconstructing a version of the requested file by applying selected stored changes to the current on-site version or the stored off-site version.

* * * * *